July 28, 1970   T. H. HOLTHUIS   3,521,751
FILTERING METHOD AND APPARATUS
Filed Dec. 15, 1967   2 Sheets-Sheet 1

INVENTOR
THEODORUS H. HOLTHUIS
BY *Maurice M. Smiley*
ATTORNEY

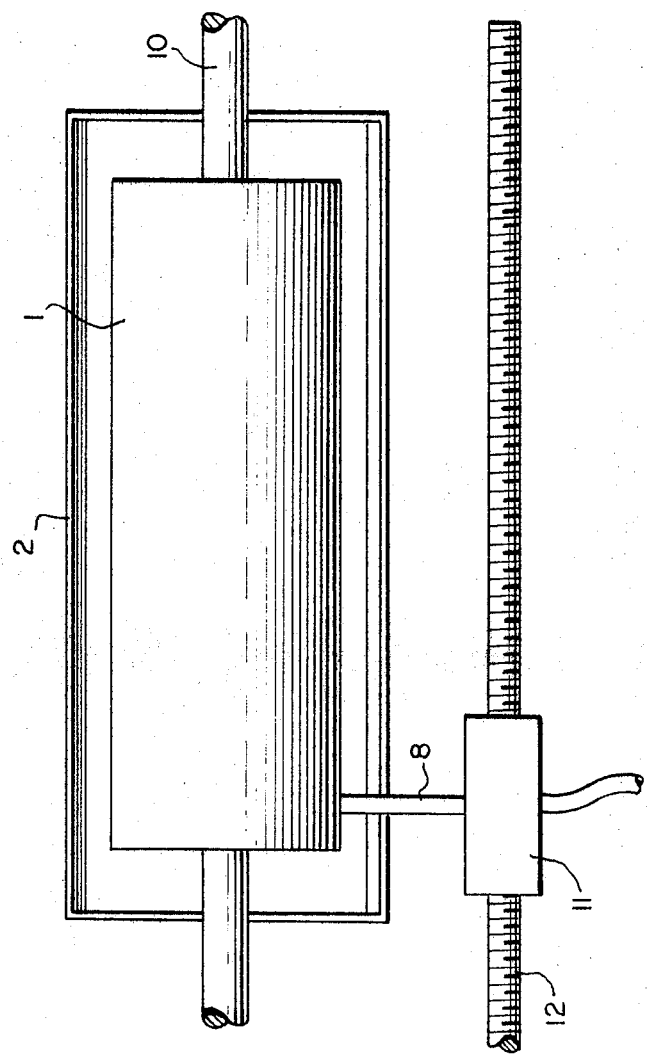

United States Patent Office 3,521,751
Patented July 28, 1970

---

3,521,751
FILTERING METHOD AND APPARATUS
Theodorus H. Holthuis, Veendam, Netherlands, assignor of one-half to Nivoba N.V., Veendam, Netherlands, a company of the Netherlands
Filed Dec. 15, 1967, Ser. No. 691,011
Int. Cl. B01d 33/06
U.S. Cl. 210—77
3 Claims

ABSTRACT OF THE DISCLOSURE

The solid phase filter cake built up on the surface of a rotating perforate drum partially submerged in a body of a mixture comprising a liquid and a solid phase is partially removed while the cake is out of contact with the body of mixture. The inner part of the cake is removed when it is reintroduced into the body of mixture by directing a jet of the mixture within the body against the inner part.

---

Figure 1:
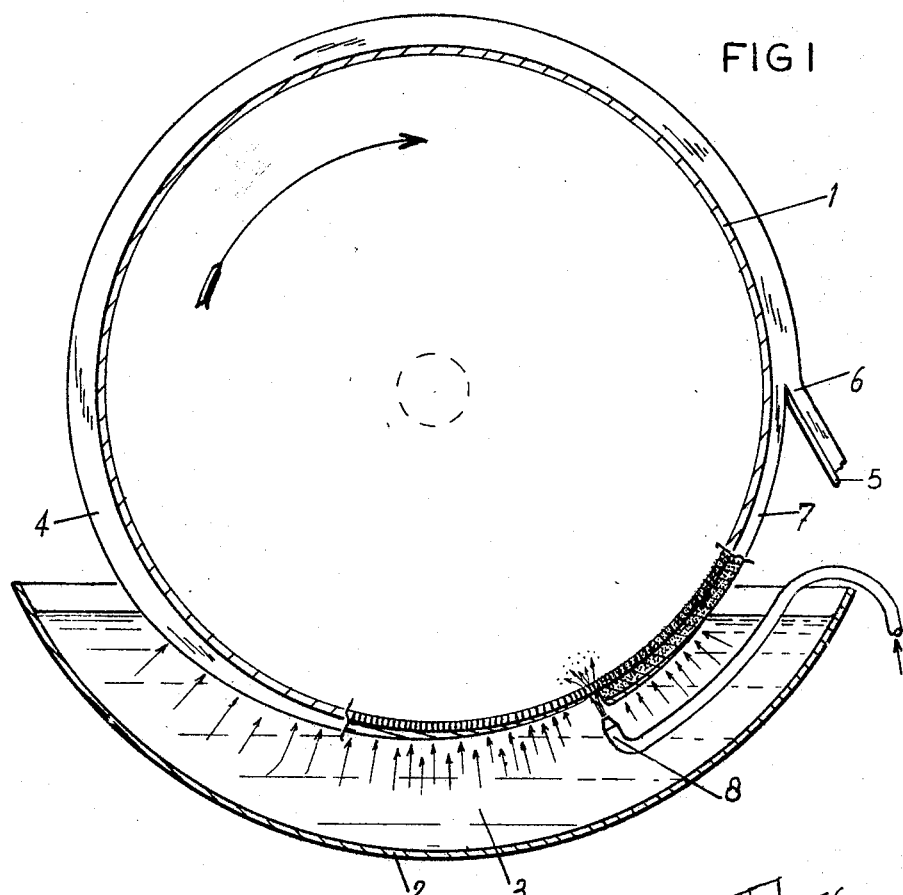

The invention relates to a method for separating the two phases of a mixture comprising a liquid and a solid phase wherein the mixture is applied to the outer surface of the perforated surface of a filter drum that is rotating about an axis and a relative depression with respect to the former surface is applied to the entire inner surface of the drum and a part of the thickness of the filter cake being formed on the perforated surface is shaved off.

Similar methods are commonly known though have the drawback that the part of the filter cake remaining on the filtering surface gradually fouls and becomes clogged whereby the output of the filter decreases and the quality of the product deteriorates. The removal of said fouled layer by periodically shaving the whole filter cake appears to be impossible as in that case the perforated surface becomes mechanically damaged. Up till now it was therefore necessary to interrupt the filtering procedure in order to remove the fouled layer.

The invention now provides an improved continuous method not having the said drawback and being characterized in that during the separation a jet of pressurized fluid is locally directed from the outside to the remaining part of the cake below the surface of the mixture to be separated so as to spout away that part and partly spout this part through the perforated surface and in that the jet and the perforated surface are relatively moved so as to clean the whole perforated surface.

By proceeding in this manner the fouled layer is periodically wholly removed without the necessity that the apparatus has to be stopped. Furthermore it is clear that damaging the perforated surface is impossible.

As a fluid for removing the fouled layer any suitable fluid may be used though a liquid is preferred, preferably in the form of the mixture to be separated in order to prevent the formation of a vacuum leak in the filtering layer. This is especially important if the filter drum for only a very minor part is submerged in the mixture to be separated.

The invention further relates to an apparatus for putting into practice the method according to the invention. Said apparatus for separating the two phases of a mixture comprising a liquid and a solid phase comprises a filtering drum adapted to rotate about its axis with its lower part immersed in a trough containing the mixture to be separated, a knife adjacent the perforated cylindrical drum surface for partly removing the filter cake from the drum, a movable nozzle below the surface of the mixture to be separated for directing a jet of a fluid on the remaining part of the filter cake and means for moving the nozzle in relation to the drum so as to cover the entire perforated surface.

If it is desired that the solid phase is obtained in a state as pure as possible it is advisable to provide an outlet pipe adjacent the nozzle for discharging the loose particles of the fouled part of the filter cake in order to prevent that these particles become mixed with the mixture again.

Figure 2:
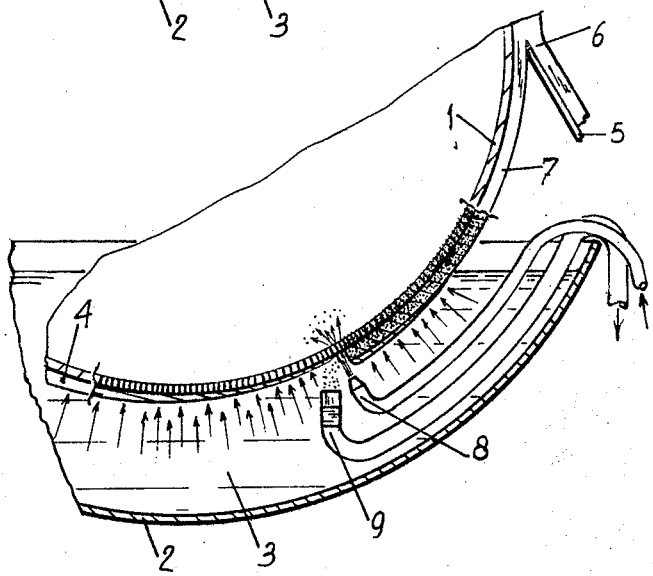

For a fuller understanding of the nature of the invention reference should be had to the following description taken in connection with the accompanying diagrammatic drawings in which FIG. 1 is a vertical sectional view of one form of apparatus embodying the invention, FIG. 2 is a fragmentary view illustrating a modification, and FIG. 3 is a diagrammatic view illustrating a nozzle drive mechanism.

In the drawings a rotary filter drum has a cylindrical perforated surface 1. The drum is rotatable in a trough 2 containing the mixture 3 to be separated in a liquid and a solid phase. By subjecting the interior of the drum to negative pressure with respect to the pressure acting exteriorly of the drum, the liquid phase is sucked through the perforated surface 1 while the solid phase remains on this surface forming the filter cake 4. The outer layer 6 of this cake is continuously removed by the knife 5 while a part of the filter cake remains on this surface 1 and serves as a filtering layer 7.

This filtering layer 7 gradually fouls and becomes clogged and is periodically removed according to the invention by means of a nozzle 8 being directed to the perforated surface below the surface of the mixture to be separated whereby a jet of liquid is directed towards this fouled layer which is squirted loose and partly through the perforated surface. Then a clean layer of the solid is again formed on the perforated surface.

In order to enable the solid phase to be gathered in a state as pure as possible the loose material of the fouled layer has to be prevented from becoming mixed again with the mixture in the trough 2. To that purpose a discharge pipe 9 is provided adjacent the nozzle 8 as shown in FIG. 2 whereby this material may be sucked off and if required fed back to the trough 2 after being purified separately.

The entire perforated surface of the drum may be freed periodically from the fouled layer by moving the unit consisting of the nozzle 8 and the discharge pipe 9 in axial direction along the cylindrical wall with such a speed that after any revolution of the drum this unit has travelled one working width. As shown in FIG. 3, the nozzle may be mounted on a suitable nut 11 engaged on the threaded feed shaft 12 for axially feeding the nozzle back and forth along the drum which is supported by the shaft 10, such mechanism being old and not constituting a part of the invention.

As a fluid for squirting clean the perforated surface the mixture to be separated is preferred in order that a solid phase layer be quickly formed again on the perforated surface. This is especially of importance if the depth of immersion of the drum in the trough is only minor and the danger of a layer of insufficient thickness being formed on the perforated surface on leaving the mixture in the trough would exist giving rise to a vacuum leak.

It will be understood that the invention is not limited to the particular embodiments hereinbefore described that are meant as an illustration of the invention.

What I claim is:

1. A method for separating the two phases of a mixture comprising a liquid and a solid phase, comprising the steps of:

continuously subjecting the interior of a rotating drum to suction while the drum is partially submerged in a body of the mixture, thereby to form a cake, consisting essentially of the solid phase, on the surface of the drum, removing an outer layer of the cake after emergence thereof from the body of the mixture to leave an inner layer of the cake on the drum and separately discharging the removed outer layer, and removing the inner layer of the cake when same is reintroduced into the body of the mixture by directing a jet of pressurized fluid against the inner layer of the cake within the body of the mixture and moving the jet of pressurized fluid axially of the drum while the latter rotates.

2. The method according to claim 1 wherein the pressurized fluid is said mixture.

3. Apparatus for separating the two phases of a mixture comprising a liquid and a solid phase, comprising in combination, a trough adapted to contain a body of the mixture, a perforate drum above said trough and partially projecting along its length thereinto so as to be partially submerged within said body of mixture, means for rotating said drum about its longitudinal axis, means for continuously subjecting the interior of said drum to suction, means for removing an outer layer of cake, consisting essentially of said solid phase, from the outer surface of said drum above said body of mixture, thereby to leave an inner layer of cake on said drum, means for receiving said removed outer layer of cake, and means for directing pressurized fluid within the confines of said trough and the body of mixture therewithin against said inner layer of cake to remove same from said drum, the last mentioned means comprising a nozzle for directing a jet of the mixture against said inner layer of said cake, and means for moving said nozzle axially of said drum.

References Cited

UNITED STATES PATENTS 2,839,194  6/1958  Lopker et al. _____ 210—75 X

SAMIH N. ZAHARNA, Primary Examiner

U.S. Cl. X.R.

210—79, 391